(12) United States Patent
Barnes

(10) Patent No.: US 7,454,113 B2
(45) Date of Patent: Nov. 18, 2008

(54) GROUNDING DEVICE FOR FIBER STORAGE TRAYS

(75) Inventor: Kathleen M. Barnes, Golden Valley, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/489,940

(22) Filed: Jul. 20, 2006

(65) Prior Publication Data

US 2008/0025682 A1    Jan. 31, 2008

(51) Int. Cl.
*G02B 6/00* (2006.01)
*H05K 7/14* (2006.01)

(52) U.S. Cl. ............................... 385/135; 361/727
(58) Field of Classification Search ............ None
See application file for complete search history.

(56) References Cited

U.S. PATENT DOCUMENTS

| | | | | |
|---|---|---|---|---|
| 3,710,199 A | * | 1/1973 | Cignoni, Jr. | 361/827 |
| 3,717,805 A | * | 2/1973 | Gnaedinger et al. | 363/13 |
| 4,353,518 A | * | 10/1982 | Taylor et al. | 248/60 |
| 4,621,876 A | * | 11/1986 | Reimer | 312/330.1 |
| 4,686,608 A | * | 8/1987 | Hosking | 361/827 |
| 5,511,144 A | | 4/1996 | Hawkins et al. | |
| 5,995,004 A | * | 11/1999 | Pellowski | 340/570 |
| 6,082,845 A | | 7/2000 | Eizadkhah et al. | |
| 6,305,556 B1 | * | 10/2001 | Mayer | 211/26 |
| 6,438,310 B1 | | 8/2002 | Lance et al. | |
| 6,501,020 B2 | * | 12/2002 | Grant et al. | 174/50 |
| 6,504,988 B1 | | 1/2003 | Trebesch et al. | |
| 7,171,099 B2 | | 1/2007 | Barnes et al. | |
| 2006/0198594 A1 | * | 9/2006 | Beck | 385/135 |

FOREIGN PATENT DOCUMENTS

EP    0 514 638 A    11/1992
WO    2004/034116    4/2004

OTHER PUBLICATIONS

Photograph of a ADC Telecommunications, Inc. Door Grounding (typical round insulated wire with crimped-on terminals used to provide a solid grounding path from an enclosure door to the frame or cabinet), 1 Page, date unknown.
Photograph of a ADC Telecommunications, Inc. Door Grounding (heavier duty version of Ex. A with heavier terminals), 1 Page, date unknown.
Chomerics, div. of Parker Hannifin Corp., "Cho-Strap Insulated Ground Strap—Technical Bulletin 203", 1999, 1 Page.

(Continued)

*Primary Examiner*—Hemang Sanghavi
*Assistant Examiner*—Omar Rojas
(74) *Attorney, Agent, or Firm*—Merchant & Gould P.C.

(57) ABSTRACT

A cable management panel having a grounding arrangement. The grounding arrangement including a rolling ground strap interconnected to each of a drawer and a chassis of the cable management panel. The rolling ground strap being arranged to include a loop that rolls along the length of the ground strap.

18 Claims, 5 Drawing Sheets

OTHER PUBLICATIONS

American Grounding Systems, Inc., Web Page—Ground Strap Types, Printed Mar. 1, 2006, pp. 1-3.
American Grounding Systems, Inc., Web Page—Ground Wires—Tinned & Bare Copper, Printed Mar. 31, 2006, pp. 1-21.
American Grounding Systems, Inc., Web Page—Flat Nickel Plated Copper Ground Straps With Tinned Copper (TC) Crimp Terminals, Printed Mar. 1, 2006, pp. 1-35.
American Grounding Systems, Inc., Web Page—Tubular Stainless Steel Ground Straps With Tinned Copper (SS) Crimp Terminals, Printed Mar. 1, 2006, pp. 1-19.
American Grounding Systems, Inc., Web Page—Solid Flat 304 Stainless Steel Grounding Straps—With Heat/No Heat Shrink Overlay, Printed Mar. 1, 2006, p. 1.
American Grounding Systems, Inc., Web Page—304 Stainless Steel Grounding Straps—All Straps Measured Hole Center to Hole Center, Printed Mar. 1, 2006, p. 1.
American Grounding Systems, Inc., Web Page—Tinned Copper Grounding Straps—All Straps Measured Hole Center to Hole Center, Printed Mar. 1, 2006, p. 1.
American Grounding Systems, Inc., Web Page—Bare & Sold Copper Straps—Sold Round, Flat & Tubular Copper, Printed Mar. 1, 2006, pp. 1-4.
American Grounding Systems, Inc., Web Page—Copper Grounding Strips—Low Impedance, Reduced EMI Radiation (Made of Flexible Solid Copper Strip With Solder Dipped Ends and Punched Holes on Both Ends), Printed Mar. 1, 2006, pp. 1-3.
American Grounding Systems, Inc., Web Page—Tubular Tinned Copper Grounding Straps—With Heat/No Heat Shrink Overlay, Printed Mar. 1, 2006, p. 1.
American Grounding Systems, Inc., Web Page—Flat Tinned Copper Grounding Straps—With Heat/No Heat Shrink Overlay, Printed Mar. 1, 2006, p. 1.
American Grounding Systems, Inc., Web Page—Large Flat Tinned Copper Grounding Straps—With Heat/No Heat Shrink Overlay, Printed Mar. 1, 2006, p. 1.
American Grounding Systems, Inc., Web Page—Custom Ground Strap Design, Printed Mar. 1, 2006, pp. 1-10.
American Grounding Systems, Inc., Web Page—Metal Braids—Available Braid Stocks (Bare Copper, Tinned Copper, Nickel Plated Copper, Stainless Steel, Aluminum), Printed Mar. 1, 2006, pp. 1-7.
ADC Telecommunications, Inc. ("Fiber Entrance Cabinet", 2001).
Hoffman Enclosures, Inc. ("Setting New Standards", Specifier's Guide, vol. 20, Chapter 12: General Accessories, pp. 12.31 and 12.45, Rev. A, Oct. 2004).

* cited by examiner

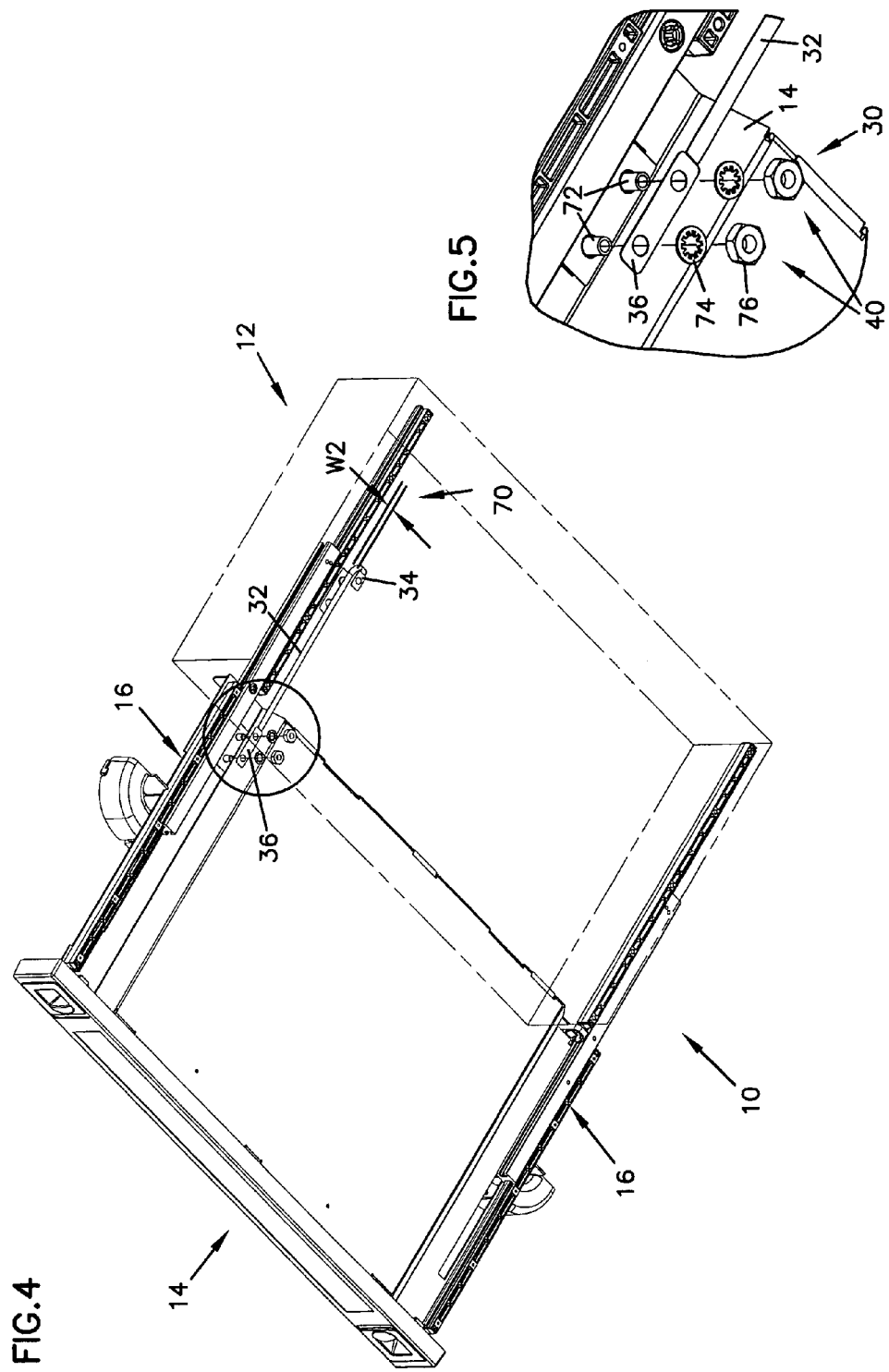

GROUNDING DEVICE FOR FIBER STORAGE TRAYS

TECHNICAL FIELD

This disclosure relates to devices and arrangements used in the telecommunications industry for managing cables. In particular, this disclosure relates to devices for use in optical fiber cable drawers.

BACKGROUND

Cable storage arrangements and devices are used in the telecommunications industry to mange fiber optic cables and prevent unnecessary or excessive displacement of optical fibers. Some examples of known arrangements include cable management panels having a chassis and sliding drawer with various devices contained within the interior of the drawer that manage the cables.

Insufficient grounding can cause problems with the proper functioning of cables stored within such panel arrangements. Some conventional panel arrangements utilize grounding devices, such as grounding wires, for example, to ground the drawers to the chassis. The wires, however, often become pinched between the drawer and chassis during movement of drawer. Other problems associated with wires and other conventional grounding devices include wear or fatigue of the grounding components, and the cost and complexity of assembly associated with providing such grounding devices.

In general, improvement has been sought with respect to grounding devices, generally to provide a long lasting grounding device that reliably functions without pinching or fatigue to better manage the electrical ground of cable management panels.

SUMMARY

The present disclosure relates to a grounding arrangement for use in a cable management panel. The grounding arrangement generally includes a ground strap interconnected to each of a drawer and a chassis of the cable management panel. In one aspect, the ground strap is a rolling ground strap positionable in a forward position and a rearward position relative to the position of the drawer. In another aspect, movement of the ground strap between a forward position and a rearward position is contained within a discrete region, the discrete region having a width approximately equal to a width of the ground strap.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 4 is another bottom perspective view of the cable management panel of FIG. 1, showing a second end portion of the grounding arrangement;

FIG. 5 is an enlarged detail view of the second end portion of the grounding arrangement of FIG. 4;

DETAILED DESCRIPTION

Reference will now be made in detail to various features of the present disclosure that are illustrated in the accompanying drawings. Wherever possible, the same reference numbers will be used throughout the drawings to refer to the same or like parts.

FIGS. 1-5 illustrate a cable management panel 10 including a grounding arrangement 30 having features that are examples of how inventive aspects in accordance with the principles of the present disclosure may be practiced. Preferred features of the cable management panel 10 with the grounding arrangement 30 are adapted to reliably manage electrostatic buildup without experiencing wear, fatigue, or failure associated with conventional grounding devices.

While the present disclosure describes use of the panel 10 and grounding arrangement 30 with regards to management of electrostatic buildup, it is to be understood that other types of electrical buildup and wayward electrical drainage from other sources, such as electrical components contained within the drawer, are similarly managed by the present grounding arrangement. Electrostatic buildup is intended to be only one example of an electrical occurrence that is grounded by the disclosed grounding arrangement.

Figure 1:
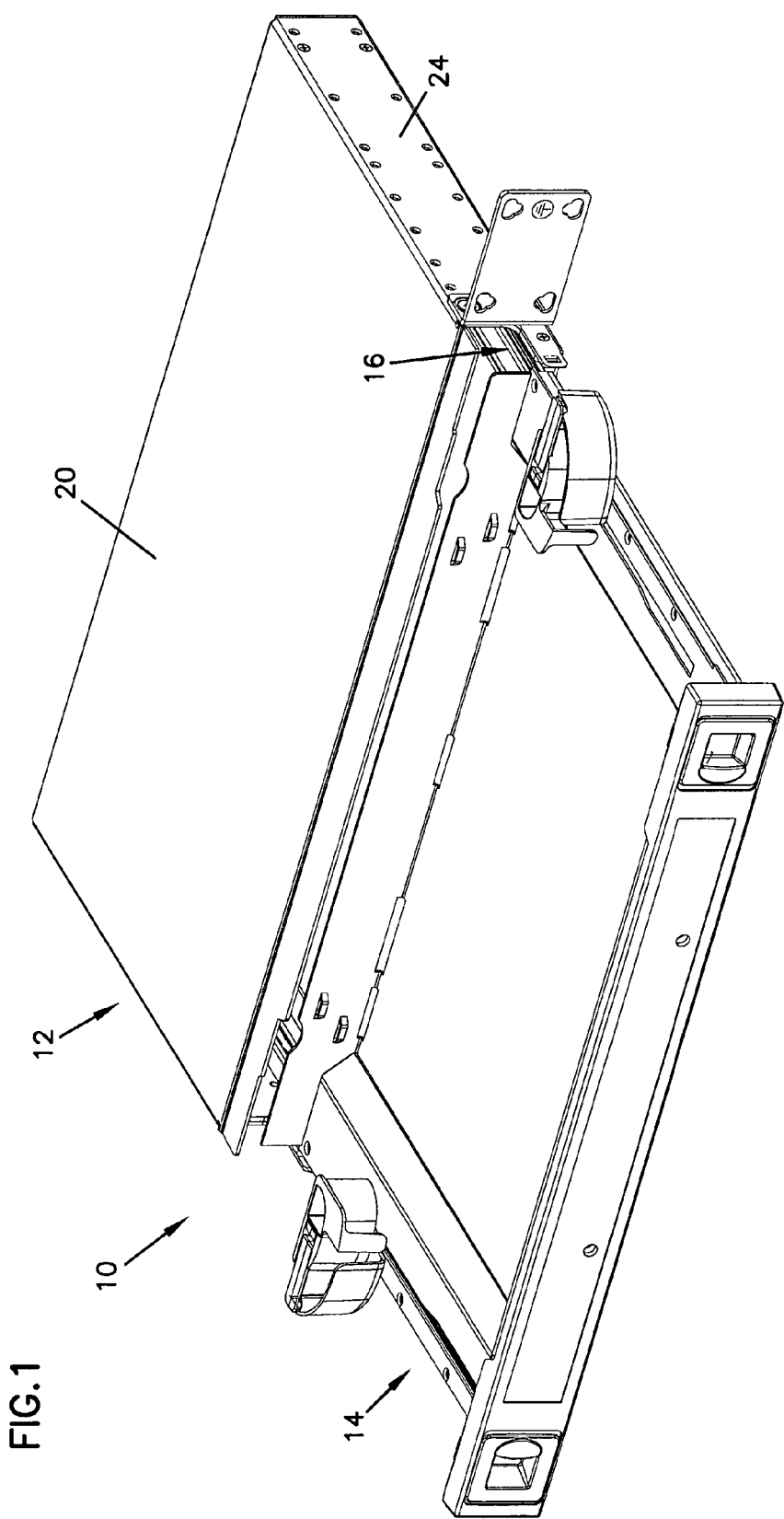
FIG. 1 is a front perspective view of one embodiment of a cable management panel having a drawer shown in an open position, and having a grounding arrangement according to the principles of the present disclosure.

In general, the cable management panel 10 of FIG. 1 is used in the telecommunication industry for storing and managing fiber optic cables. The panel can be configured with various managing and distribution devices, such as cable spools, radius limiters, storage trays, attenuators, couplers, switches, multiplexers, splitters, combiners, or splices, for example. In use, the panel 10 is typically mounted to a rack, cabinet, enclosure, or other mounting fixture (not shown). In some applications, a number of cable management panel 10 incorporating the features of the present disclosure can be mounted to a rack or enclosure to provide a system of cable management panels.

As shown in FIG. 1, the cable management panel 10 includes a frame or chassis 12 and a drawer 14. A drawer slide 16 operably interconnects the drawer 14 and the chassis 12. The drawer slide 16 allows the drawer 14 to easily slide relative to the chassis 12 from a closed position to an open position. Typically, the cable management panel 10 is oriented and arranged such that the drawer 14 slides out horizontally from the chassis 12. Further details of an example cable management panel having a chassis, drawer, and slide arrangement that can be used in accordance with the principles disclosed is described in U.S. patent application Ser. No. 10/631,675; the disclosure of which is incorporated herein by reference.

Figure 2:
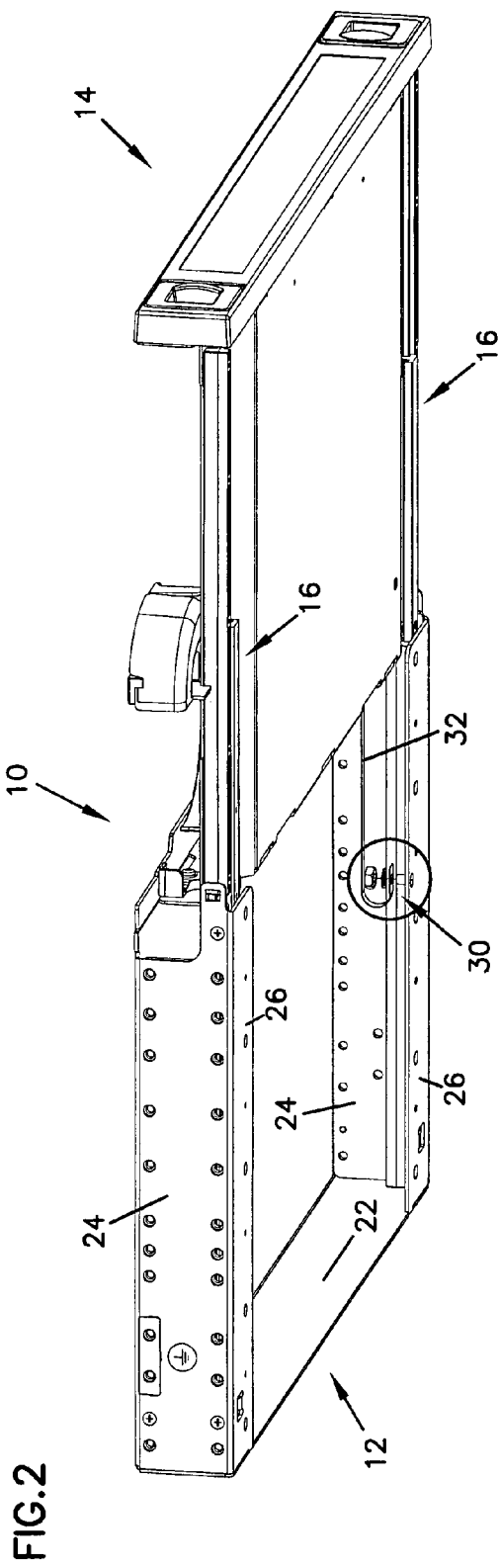
FIG. 2 is a bottom perspective view of the cable management panel of FIG. 1, showing a first end portion of the grounding arrangement.
Figure 3:
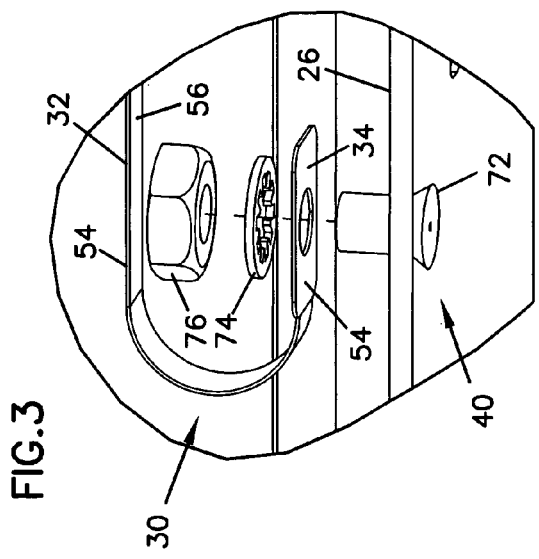
FIG. 3 is an enlarged detail view of the first end portion of the grounding arrangement of FIG. 2.

The chassis 12 of the present cable management panel 10 generally includes a top cover 20, a back wall 22 (FIG. 2), sides 24, and inwardly projecting bottom ledges 26 (FIG. 2). In the illustrated embodiment, each of the top cover 20, back wall 22, sides 24, and bottom ledges 26 are an integral construction formed of, for example, bent sheet metal. It is contemplated, however, that each component of the chassis 12 can also be constructed individually and fastened together.

Referring now to FIG. 2, one embodiment of a grounding arrangement 30 that can be used in accordance with the principle disclosed is illustrated. The grounding arrangement 30 includes a ground strap 32 that is interconnected between the drawer 14 and the chassis 12. The grounding arrangement 30 grounds the drawer 14 to the chassis 12 to dissipate electrical occurrences, such as an amperage drain from electrostatic buildup within the panel 10, for example.

The present ground strap 32 is a rolling ground strap, that is, the ground strap rolls in response to movement of the drawer, as opposed to folding or compressing, for example. As will be described in greater detail hereinafter, the rolling ground strap 32 does not fold and unfold or compress and expand, thereby reducing the occurrence or likelihood of fatigue and wear. The rolling ground strap 32 can handle extensive cycling (i.e. repeated drawer opening and closing), as there is little stress or strain during drawer use. In addition, the present grounding arrangement 30 is compact and will not become pinched between the drawer and chassis. The grounding arrangement instead rolls forward and rearward in only a discrete, designated region of the cable management panel 10.

Referring now to FIGS. 2-5, the ground strap 32 of the grounding arrangement 30 has a first end 34 (FIG. 3) that is interconnected to the chassis 12 and a second end 36 (FIG. 5) that is interconnected to the drawer 14. In the illustrated embodiment, fasteners 40 are utilized to secure the first and second ends 34, 36 of the rolling ground strap 32 to the respective chassis 12 and drawer 14. The fasteners 40 include a threaded bolt 72, a lock washer 74, and a threaded nut 76. Other securing constructions, such as weldments or rivets, for example, can also be used to secure the ground strap between the chassis and drawer.

Preferably, the rolling ground strap 32 is made of a conductive material, such as stainless steel, for example. The conductive material provides an electrical ground path along which electrical occurrences, such as amperage drain from electrostatic buildup and wayward electrical drainage from other sources, are dissipated. Other conductive materials that can be used include beryllium and copper, for example.

Figure 6:
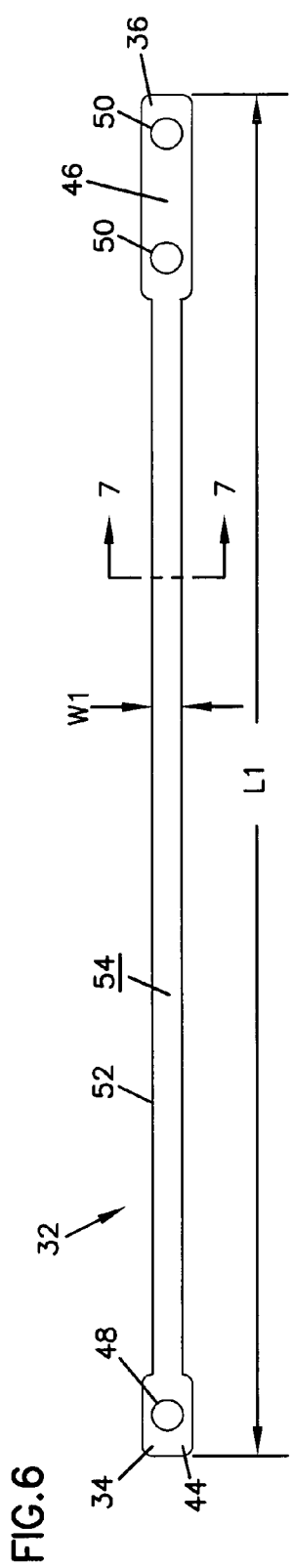
FIG. 6 is a top plan view of a ground strap of the grounding arrangement shown in FIGS. 2 and 4.
Figure 7:
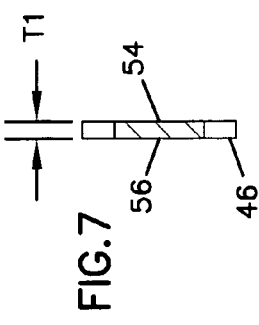
FIG. 7 is a cross-sectional view of the ground strap of FIG. 6, taken along line 7-7.

Referring now to FIG. 6, the first and second ends 34, 36 of the ground strap 32 define enlarged tabs 44, 46. Mounting holes 48, 50 are formed in the enlarge tabs 44, 46. The mounting holes 48, 50 correspond to the size and type of fasteners 40 utilized to secure the ground strap 32 to the chassis 12 and drawer 14. The ground strap includes a central portion 52 that extends between the enlarge tabs 44, 46. The ground strap 32 further defines a first side 54 and a second opposite side 56 (FIG. 7). In the illustrated embodiment, the rolling ground strap 32 has a generally, flat rectangular cross-section.

Referring to FIGS. 6 and 7, the ground strap 32 of the grounding arrangement 30 has an overall length L1, an overall width W1, and an overall thickness T1, although the disclosed principles can be applied in a variety of sizes and applications. The length L1 of the strap 32 is generally defined between the first and second ends 34, 36 of the strap, and is preferably between 6.0 and 12.0 inches; more preferably between about 7.0 and 9.0 inches. The width W1 of the strap 32 is generally defined by the central portion 40 of the ground strap 32, and is preferably between 0.075 and 0.500 inches; more preferably between about 0.100 and 0.250 inches. The thickness T1 of the ground strap 32 is generally defined between the first side 54 of the ground strap and the second side 56; and is preferably between 0.003 and 0.012; more preferably between about 0.003 and 0.006 inches.

Figure 8:
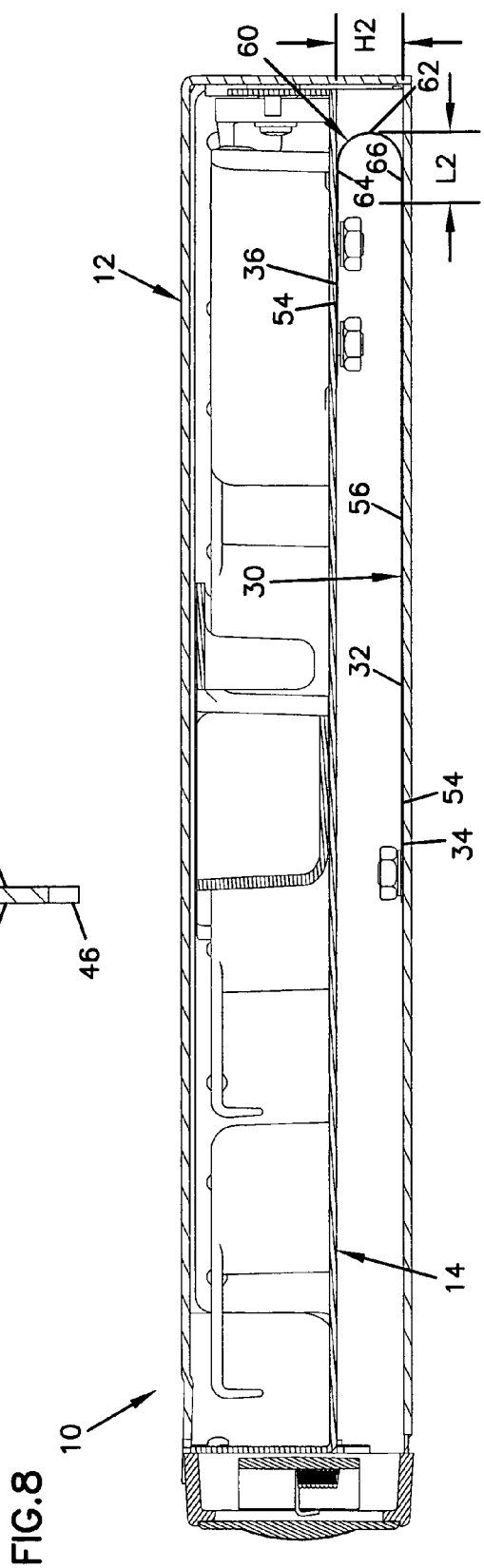
FIG. 8 is a side view of the cable management panel of FIG. 1, shown with the drawer in a closed position, and illustrating the grounding arrangement in an associated rearward position.
Figure 9:
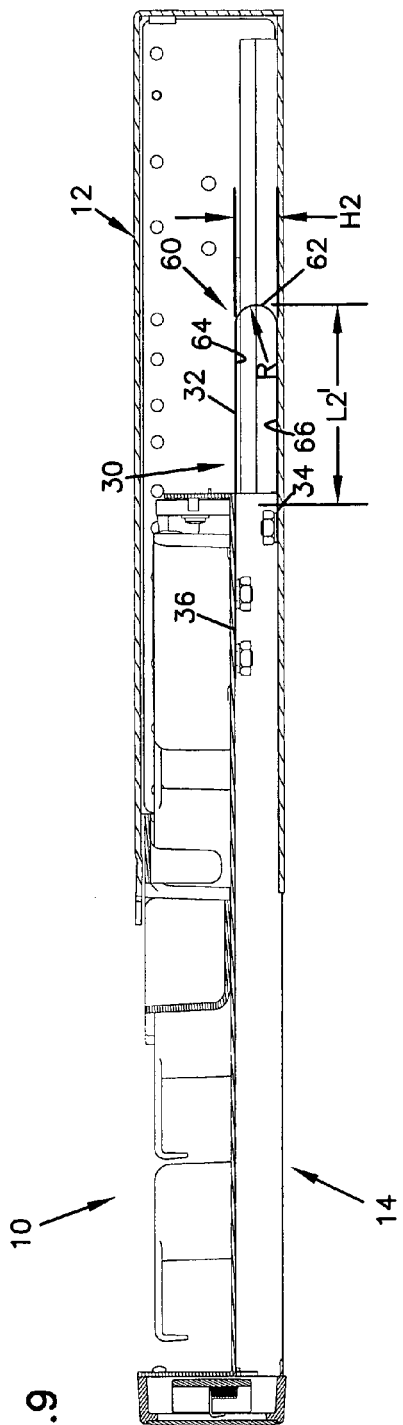
FIG. 9 is a side view of the cable management panel of FIG. 8, shown with the drawer in an intermediate position, and illustrating the grounding arrangement in an associated intermediate position.
Figure 10:
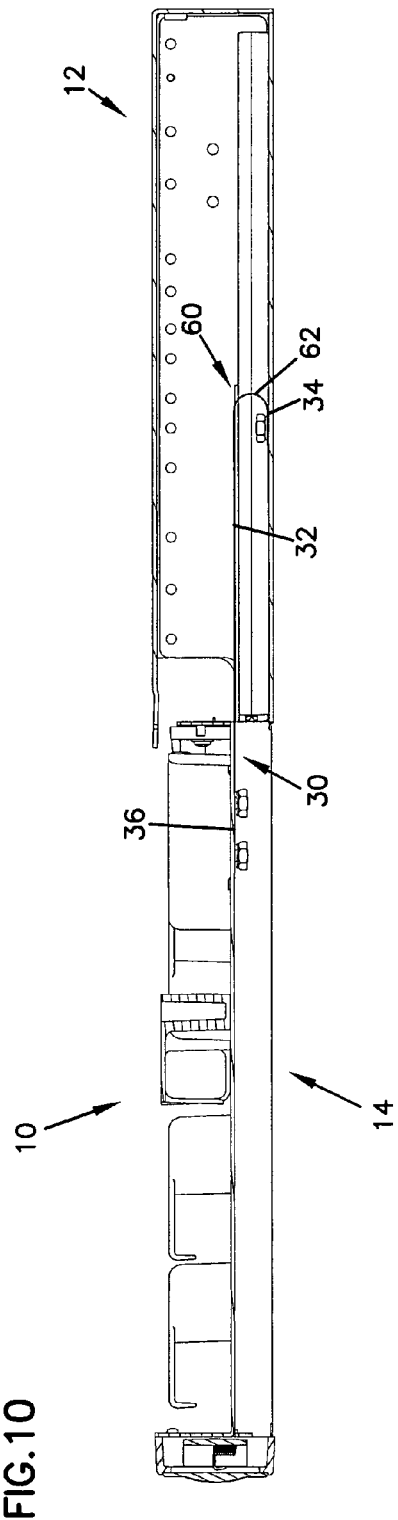
FIG. 10 is a side view of the cable management panel of FIG. 9, shown with the drawer in an open position, and illustrating the grounding arrangement in an associated forward position.

Referring now to FIGS. 8-10, the rolling ground strap 32 is positionable in and between a forward position and a rearward position. When the drawer 14 is in a closed position, as shown in FIG. 8, the rolling ground strap 32 is in the rearward position. FIG. 9 illustrates the drawer 14 in an intermediate position; the rolling ground strap 32 is correspondingly in an intermediate position between the rearward position and the forward position. When the drawer 14 is in an open position, as shown in FIG. 10, the rolling ground strap 32 is in the forward position.

Preferably, the rolling ground strap 32 rolls between the rearward position and the forward position. That is, the ground strap 32 does not fold and unfold or compress and expand during operation of the drawer 14. Folding/unfolding and compressing/expanding movement can cause fatigue and excessive component wear. Rolling reduces the likelihood of component wear and fatigue.

Preferably, the rolling ground strap 32 rolls between the rearward position and the forward position generally without lateral movement. That is, the ground strap 32 rolls within a discrete and predetermined region 70 (FIG. 4) within the panel 10. The discrete and predetermined region 70 is generally the region required for clearance of the central portion 52 of the ground strap 32, as the ends 34, 36 of the strap are mounted flush with the chassis and drawer. Because there is no lateral movement of the ground strap 32, the discrete region has a width W2 approximately equal to the width W1 of the ground strap. This advantageously minimizes the spatial requirements of the grounding arrangement 10.

Referring back to FIGS. 3 and 5, each of the first and second ends 34, 36 of the ground strap 32 is secured to the respective chassis 12 and drawer 14 such that the same one of the first and second sides 54, 56 of the strap is mounted flush with each of the chassis 12 and the drawer 14. In particular, the ground strap 32 is mounted, for example, with the first side 54 flush or in contact with the mounting surface of the ledge 26 of the chassis 12, and with the first side 54 also flush or in contact with the mounting surface of the drawer 14. By mounting the ground strap 32 in this manner, a loop 60 (FIG. 8) is formed in the mounted ground strap 32 between the first and second ends 34, 36 of the ground strap.

Referring now to FIGS. 8-10, the loop 60 is generally defined by a curved loop end 62, and overlapping sections 64, 66 of the center portion 52 of the ground strap 32. As shown in FIG. 8, the loop 60 has a height H2 and a length L2. The height H2 is defined generally as the vertical distance between the first and second ends 34, 36 of the strap 32 when the strap is mounted to the chassis and drawer. More specifically, the height H2 is defined by a bend radius R (FIG. 9) of the curved loop end 62 of the loop 60. In the illustrated embodiment, the bend radius R of the curved loop end 62 is between about 0.5 and 1.0 inches. The height H2 of the loop 60 is accordingly two times the bend radius R of the curved loop end 62. The length L2 of the loop 60 is defined between the curved looped end 62 and a point where the central portion 52 of the strap 32 no longer overlaps itself.

In alternative embodiments, the bend radius R can be greater or lesser, depending upon the material of which the ground strap 32 is made. In addition, the bend radius R, and accordingly the height H2 of the loop 60 can be greater or lesser depending upon the vertical and horizontal distance between attachments locations of the ends of the ground strap and the desired travel distance of the drawer.

As shown in FIG. 8, the loop 60 is located adjacent to the second end 36 of the ground strap 32 when the drawer 14 is in the closed position. Referring to FIG. 10, the loop 60 is located adjacent to the first end 34 of the ground strap 32 when the drawer 14 is in the open position. The size of the loop 60 increase and decreases in response to movement of the drawer 14. That is, the length L2 of the loop 60 changes, or lengthens and shortens, in response to movement of the drawer 14. The height H2 of the loop 60 remains generally constant during movement of the drawer 14.

In use, the curved loop end 62 of the loop 60 rolls along the length of the ground strap 32 (i.e., along the center portion 52) during movement of the drawer 14. As the curved loop end 62 rolls along the center portion 52, the length of the loop 60 changes. For example, the loop 60 has a first loop length L2 (FIG. 8.) when in the drawer is in the closed position, and a second longer loop length L2' (FIG. 9) when the drawer is in the intermediate position between the closed and open positions. The change in loop length corresponds to the rolling location of the curved loop end 62 of the loop 60, and the change in the length of the overlapping sections 64, 66.

Because the loop 60 simply rolls along the length of the ground strap 32, little stress or strain is placed upon the grounding arrangement 30. This rolling ground strap feature of the present grounding arrangement 30 permits the grounding arrangement to handle extensive drawer use without wear and fatigue. The grounding arrangement 30 is also designed to require minimal panel space, thereby reducing costs associated with providing panels sized and configured to accommodate conventional grounding devices. Further, because of the simple design of the present grounding arrangement 30, the grounding arrangement is easy to assembly, thereby reducing assembly costs.

The above specification provides a complete description of the invention. Since many embodiments of the invention can be made without departing from the spirit and scope of the invention, certain aspects of the invention resides in the claims hereinafter appended.

What is claimed is:

1. A cable management panel, comprising:
   a) a drawer and a chassis, the drawer being selectively positionable in an open position and a closed position;
   b) a slide assembly interconnected to the drawer and the chassis, the slide assembly providing sliding movement of the drawer relative to the chassis; and
   c) an electrical grounding arrangement, including:
      i) a rolling ground strap having first and second ends each interconnected to one of the drawer and the chassis, the rolling ground strap defining a loop located between the first and second ends;
      ii) wherein the loop of the rolling ground strap lengthens and shortens in response to movement of the drawer, and wherein the loop has a height and a length, the height of the loop remaining generally constant during movement of the drawer.

2. The panel of claim 1, wherein the rolling ground strap rolls between a shorter-loop position and a longer-loop position generally without lateral movement.

3. The panel of claim 1, wherein the rolling ground strap rolls forward and rearward within a discrete region, the discrete region having a width approximately equal to a width of the ground strap.

4. The panel of claim 1, wherein the height of the loop is defined by a bend radius of the ground strap, the bend radius being between about 0.5 and 1.0 inches.

5. The panel of claim 1, wherein loop is located adjacent to the first end of the ground strap when the drawer is in the open position, and wherein the loop is located adjacent to the second end of the ground strap when the drawer is in the closed position.

6. The panel of claim 1, wherein a curved loop end of the loop rolls along the length of the ground strap during movement of the drawer.

7. The panel of claim 1, wherein the rolling ground strap has a flat rectangular cross-section.

8. The panel of claim 7, wherein the flat rectangular cross-section of the rolling ground strap defines a width, the width being between about 0.100 and 0.250 inches.

9. The panel of claim 7, wherein the flat rectangular cross-section of the rolling ground strap defines a thickness, the thickness being between about 0.003 and 0.006 inches.

10. The panel of claim 1, wherein the electrical grounding arrangement provides an electrical pathway along which electrical occurrences are dissipated.

11. A cable management panel, comprising:
    a) a drawer and a chassis, the drawer being selectively positionable in an open position and a closed position;
    b) a slide assembly interconnected to the drawer and the chassis, the slide assembly providing sliding movement of the drawer relative to the chassis; and
    c) an electrical grounding arrangement, including:
       i) a ground strap having a flat rectangular cross-section that defines a width, the ground strap including a first end secured to the chassis and a second end secured to the drawer, the ground strap including a loop located between the first end and the second end;
       ii) wherein the loop of the ground strap has a height and a length, the length of the loop increasing and decreasing in response to movement of the drawer, the ground strap being contained within a discrete region during movement of the drawer, the discrete region having a width approximately equal to a width of the ground strap.

12. The panel of claim 11, wherein the ground strap rolls between a forward position and a rearward position relative to movement of the drawer.

13. The panel of claim 12, wherein the ground strap rolls generally without lateral movement.

14. The panel of claim 12, wherein the ground strap further includes a first side and a second opposite side, each of the first and second ends of the ground strap being secured to the respective chassis and drawer such that the same one of the first and second sides is mounted flush with each of the chassis and the drawer.

15. The panel of claim 11, wherein the height of the loop remains generally constant during movement of the drawer.

16. The panel of claim 11, wherein a curved loop end of the loop rolls along a length of the ground strap during movement of the drawer.

17. The panel of claim 16, wherein the curved loop end of the loop is located adjacent to the first end of the ground strap when the drawer is in the open position, and wherein the curved loop end is located adjacent to the second end of the ground strap when the drawer is in the closed position.

18. The panel of claim 11, wherein the electrical grounding arrangement provides an electrical pathway along which electrical occurrences are dissipated.

* * * * *